(12) United States Patent
Suita et al.

(10) Patent No.: US 7,664,570 B2
(45) Date of Patent: Feb. 16, 2010

(54) METHOD AND APPARATUS FOR LIMITING THE MOVEMENT OF A ROBOT, AND A ROBOT EQUIPPED WITH SAID APPARATUS

(75) Inventors: Kazutsugu Suita, Nagoya (JP); Morihiko Okura, Nishikamo-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 539 days.

(21) Appl. No.: 10/829,153

(22) Filed: Apr. 22, 2004

(65) Prior Publication Data
US 2004/0249508 A1 Dec. 9, 2004

(30) Foreign Application Priority Data
Apr. 23, 2003 (JP) ............................. 2003-118411

(51) Int. Cl.
*G06F 19/00* (2006.01)

(52) U.S. Cl. .................. 700/245; 700/95; 700/248; 700/260; 700/261; 700/900; 901/1; 901/2; 901/9; 901/14; 901/16; 901/17; 901/28; 901/29; 901/30; 901/42; 318/563; 318/566; 318/568.1; 318/568.11; 318/568.12; 318/568.15; 318/568.16; 318/568.17; 318/568.18; 318/568.2; 318/568.21; 318/568.23; 706/45; 706/46; 706/47; 706/48; 706/49; 706/50; 706/51

(58) Field of Classification Search ................. 700/245, 700/261, 248, 900; 901/1–10, 14–18, 28–29, 901/31, 41–42, 79; 706/45–61; 318/568.1–568.25, 318/563, 566; 382/153
See application file for complete search history.

(56) References Cited

U.S. PATENT DOCUMENTS 4,683,772 A * 8/1987 Colimitra .................. 74/490.01
4,697,239 A * 9/1987 Sicard et al. ................. 700/113
4,891,765 A * 1/1990 Hatori et al. ................. 700/249
5,084,826 A * 1/1992 Hariki et al. ................. 700/248
5,086,262 A * 2/1992 Hariki et al. ............. 318/568.1

(Continued)

FOREIGN PATENT DOCUMENTS

DE          34 08 173 A1     9/1985

(Continued)

OTHER PUBLICATIONS

Office Action dated Aug. 22, 2006, for Japanese Patent Application No. 2003-118411, 2 pages.

(Continued)

*Primary Examiner*—Khoi Tran
*Assistant Examiner*—Jorge O Peche
(74) *Attorney, Agent, or Firm*—Finnegan, Henderson, Farabow, Garrett & Dunner, LLP (57) ABSTRACT

The safety in robotic operations is enhanced and the floor space in a factory or the like is effectively utilized. A virtual safety barrier 50 including the trajectory of movement of a work or tool 7 mounted on a wrist 5 of a robot 1 in operation is defined in a memory. At least two three-dimensional spatial regions S (S1 to S3) including a part of the robot including the work or tool are defined. Predicted positions of the defined three-dimensional spatial regions obtained by trajectory calculations are matched with the virtual safety barrier 50, and if the predicted position of any one of the defined three-dimensional spatial regions based on trajectory calculations is included in the virtual safety barrier 50, a control is effected to stop the movement of the robot arms 3 and 4.

8 Claims, 7 Drawing Sheets

U.S. PATENT DOCUMENTS

| | | | | |
|---|---|---|---|---|
| 5,182,641 | A * | 1/1993 | Diner et al. | 348/86 |
| 5,248,341 | A * | 9/1993 | Berry et al. | 118/698 |
| 5,259,722 | A * | 11/1993 | Inoue et al. | 414/735 |
| 5,341,458 | A * | 8/1994 | Kaneko et al. | 700/245 |
| 5,347,459 | A * | 9/1994 | Greenspan et al. | 700/255 |
| 5,399,951 | A * | 3/1995 | Lavallee et al. | 318/567 |
| 5,523,663 | A * | 6/1996 | Tsuge et al. | 318/568.16 |
| 5,561,742 | A * | 10/1996 | Terada et al. | 700/255 |
| 5,579,444 | A * | 11/1996 | Dalziel et al. | 700/259 |
| 5,798,627 | A * | 8/1998 | Gilliland et al. | 318/568.14 |
| 5,906,761 | A * | 5/1999 | Gilliland et al. | 219/124.34 |
| 6,218,802 | B1 * | 4/2001 | Onoue et al. | 318/568.13 |
| 6,244,809 | B1 * | 6/2001 | Wang et al. | 414/1 |
| 6,249,718 | B1 * | 6/2001 | Gilliland et al. | 700/255 |
| 6,282,460 | B2 * | 8/2001 | Gilliland et al. | 700/255 |
| 6,317,653 | B1 * | 11/2001 | Kamiya | 700/260 |
| 6,378,387 | B1 * | 4/2002 | Froom | 73/865.8 |
| 6,414,744 | B1 * | 7/2002 | Kuiper et al. | 355/75 |
| 6,684,129 | B2 * | 1/2004 | Salisbury et al. | 700/245 |
| 7,027,965 | B2 * | 4/2006 | Hannaford et al. | 703/2 |
| 7,099,745 | B2 * | 8/2006 | Ebert | 700/245 |
| 7,155,316 | B2 * | 12/2006 | Sutherland et al. | 700/248 |
| 7,395,606 | B2 * | 7/2008 | Crampton | 33/503 |
| 2001/0004718 | A1 * | 6/2001 | Gilliland et al. | 700/255 |
| 2005/0166413 | A1 * | 8/2005 | Crampton | 33/503 |
| 2005/0209734 | A1 * | 9/2005 | Tanaka et al. | 700/245 |
| 2006/0020370 | A1 * | 1/2006 | Abramson | 700/245 |
| 2006/0184279 | A1 * | 8/2006 | Okamoto et al. | 700/245 |
| 2007/0032906 | A1 * | 2/2007 | Sutherland et al. | 700/248 |

FOREIGN PATENT DOCUMENTS

| | | |
|---|---|---|
| EP | 0 582 715 A1 | 2/1994 |
| EP | 1 239 354 A1 | 9/2002 |
| EP | 1 267 234 A2 | 12/2002 |
| JP | 64-16395 | 1/1989 |
| JP | 5 204 428 | 8/1993 |
| JP | 7-24762 | 1/1995 |
| JP | 7 036 519 | 2/1995 |
| JP | 07 129214 | 5/1995 |
| JP | 8-108383 | 4/1996 |
| JP | 11-347983 | 12/1999 |
| JP | 2000 006083 | 1/2000 |
| JP | 2000 039911 | 2/2000 |
| JP | 2001 001 291 | 1/2001 |
| JP | 2001 315087 | 11/2001 |
| JP | 2003 280710 | 10/2003 |

OTHER PUBLICATIONS

Notice of Reasons for Rejection from the Japanese Patent Office, mailed Mar. 20, 2007, for Japanese Patent Application No. 2003 118411, 2 pp.

* cited by examiner

| REFERENCE POINT | a1 | a2 | a3 | ---- | an |
|---|---|---|---|---|---|
| REFERENCE VALUE | a1p | a2p | a3p | ---- | anp |
| MARGIN | k | k | k | ---- | k |
| MEASURED VALUE | a1P | a2P | a3P | ---- | NO DATA |
| COMPARISON | \|MEASURED VALUE - REFERENCE VALUE\|<k | \|MEASURED VALUE - REFERENCE VALUE\|<k | \|MEASURED VALUE - REFERENCE VALUE\|≥k | ---- | |
| OPERATION | CONTINUE | CONTINUE | STOP CONTROL | | |

METHOD AND APPARATUS FOR LIMITING THE MOVEMENT OF A ROBOT, AND A ROBOT EQUIPPED WITH SAID APPARATUS

BACKGROUND OF THE INVENTION

1. Technical Field

The present invention relates to a robot movement limiting method and apparatus, and to a robot apparatus equipped with the robot movement limiting apparatus.

2. Background Art

Robots, particularly those for industrial purposes, are widely used in automobile manufacturing factories and elsewhere. When the robots are operated, a robot arm and its wrist (together with a work or tools attached to the wrist) are instructed by a preset program stored in a control device to move along predetermined trajectories, such that they do not interfere with peripheral devices or travel wasteful distances. Further, a safety barrier is usually put up outside the aforementioned trajectories with a necessary margin such that no harm is ever inflicted to the operator, for example, by the movement of the arm or wrist of the robot.

The range of movement of a robot is also often controlled by a computer. For example, Patent Document 1 (JP Patent Publication (Kokai) No. 64-16395) discloses an industrial-robot control apparatus adapted to determine if the calculated transportation position of the arm tip (three-dimensional coordinate position of the robot) is included in a preset movement-prohibited region, at predetermined periods. If it is determined that the calculated position is within the preset range, the movement of the robot is ceased. Patent Document 2 (JP Patent Publication (Kokai) No. 8-108383) discloses a control apparatus whereby, in a robot equipped with an arm having a wrist joint, an envelope sphere is obtained that is created when the object that is being held is rotated about the wrist joint. Then, the presence or absence of contact with an obstacle as the envelope sphere is moved is determined and, if it is determined that a contact is probable, a new path is determined that would not result in the envelope sphere coming into contact with the obstacle.

By using the control methods disclosed in Patent Documents 1 and 2, the robot can be provided with alerting information before the work or tool mounted at the arm tip actually comes into the preset movement-prohibited region (obstacles), so that the robot can be operated more safely. These methods can protect the operator from harm or effectively prevent the incidence of the arm tip colliding with peripheral equipment when, particularly, the arm travels along trajectories other than those preset by the program, such as when the robot is being taught or upon program modification, or due to disturbance or noise.

Patent Document 1: JP Patent Publication (Kokai) No. 64-16395 A (1989)

Patent Document 2: JP Patent Publication (Kokai) No. 8-108383 A (1996)

SUMMARY OF THE INVENTION

When a robot is operated according to a certain program, the work or tools mounted on its joint or on the tip of the arm each have a certain three-dimensional range of movement. During the operation of the robot, the three-dimensional range of movement for each work or tool is indispensable, and the aforementioned movement-prohibited region is set with a certain margin (safety region) provided on the outside. In the method of Patent Document 1, it is determined whether the transported position of the arm tip (three-dimensional coordinate position of the robot) will be in contact with the movement-prohibited region. Thus, while the presence or absence of contact between the three-dimensional transportation range of the arm tip and the movement-prohibited region can be determined, the method cannot predict whether the joint or the wrist portion of the robot will be in contact with the movement-prohibited region. As a result, the so-called "elbow-hitting" phenomenon involving the joint or wrist portions cannot be easily and effectively avoided according to this prior art.

In the method of Patent Document 2, an envelope sphere that is created as the supported object is rotated about the wrist joint is determined, and it is then determined whether the envelope sphere will be in contact with an obstacle (which could be considered synonymous with the movement-prohibited region). This method can be expected to provide a more safety-oriented stop control than that described in Patent Document 1. However, the radius of the envelope sphere created in this prior art is that of a single envelope sphere "created as the supported object is rotated about the wrist joint." Such envelope sphere would have a large radius, and if the movement-prohibited region is to be set while ensuring the aforementioned three-dimensional range of movement required, the movement-prohibited region would have to be set at a location significantly distanced from the robot. That would result in a waste in the limited floor area of a factory or the like, where an improved robot movement-limiting method is called for in order to achieve reductions in space during the design of factory lines. In addition, this prior art does not take into account the range of movement of the joint portion of the robot, for example.

In view of the aforementioned problems of the prior art, it is the object of the present invention to provide a robot movement-limiting method and apparatus, and a robot apparatus equipped with the robot movement-limiting apparatus. When setting the movement-prohibited region (the boundary of which will be hereafter referred to as "a virtual safety barrier") for limiting the movement of a robot, the virtual safety barrier can be set in a narrower range than that in the conventional methods while ensuring the three-dimensional movement range necessary for robotic operations involving the joint and wrist of the robot or each work or tool mounted on the wrist, for example. The invention therefore allows the floor area or space of a factory or the like to be effectively utilized.

In order to achieve the aforementioned object, the invention provides, in a first aspect, a method of limiting the movement of a robot, the method comprising the steps of:

defining in a memory a virtual safety barrier including a trajectory of a work or tool mounted on a wrist of a robot in operation with a necessary margin;

defining at least two three-dimensional spatial regions including parts of the robot including the work or tool;

matching a predicted position of the defined three-dimensional spatial region, which is obtained by trajectory calculations, with the virtual safety barrier; and carrying out a control to stop the movement of the arm including any one of the three-dimensional spatial regions if at least part of the predicted position, which is obtained by trajectory calculations, of any one of the defined three-dimensional spatial regions is included in said virtual safety barrier.

In this method, at least two three-dimensional spatial regions including a part of the robot including the work or tool are defined. The part of the robot as the thus defined three-dimensional spatial regions include the joint or wrist of the robot main body, or the work or tool mounted on the wrist, for example. They are appropriately selected depending on the actual operation environment of the robot or the processing capability of the control device. The work or tool may be defined as a single three-dimensional spatial region, or they may be defined as a plurality of separate three-dimensional spatial regions, depending on the size of the work or tool.

In the above invention, where the two or more portions are defined as three-dimensional spatial regions, if a part of the predicted position of any one of the three-dimensional spatial regions based on trajectory calculations exceeds the virtual safety barrier, a control is effected such that the movement of the arm including the at least one three-dimensional spatial region is stopped. By thus defining the two or more portions as three-dimensional spatial regions, a more safety-oriented movement limitation can be effected than in the case where the control is effected based on a single three-dimensional spatial region. Further, the virtual safety barrier can be more finely and narrowly set. On the other hand, when the virtual safety barrier is defined beforehand as covering a certain range, the region within the virtual safety barrier can be more effectively utilized as the trajectory of movement of the robot. Thus, the floor area and space in a factory or the like can be effectively utilized.

The greater the number of the three-dimensional spatial regions that are defined, the more narrowly the range of the virtual safety barrier can be defined. The number is appropriately determined depending on the processing capability of the control device or the actual operation environment of the robot, for example. When the work or tool is large-sized, they can be divided into a plurality of parts and a three-dimensional spatial region may be defined for each part, such that the virtual safety barrier can be more narrowly set.

When the operation environments are changed, such as upon teaching, for example, or when disturbance arises, the robot arm is moved from point A to point X, for example, in a trajectory that is not included in the program. In that case, a new movement trajectory to point X is calculated by estimation (trajectory calculations) by a computer. If, at the predicted position, any one of the three-dimensional spatial regions is determined to come into contact with the virtual safety barrier of the robot, a stop control for the robot arm (including the at least one three-dimensional spatial region) is effected. With the increase in speed and size of the robots, their arm or wrist portions are moved with larger inertia, so that a time (distance) must be provided for deceleration and braking. The estimation allows the robot itself to recognize a forward position spaced apart from the virtual safety barrier by a predetermined distance as a braking start position, so that the arm can be safely stopped.

In the present invention, the virtual safety barrier may be defined as appropriate in view of the processing capability of the control device, as a set of lines, a set of curves or a set of lines and curves, for example. In practice, the virtual safety barrier should desirably be defined in the memory such that it is inside a physical safety barrier at the factory or the like. In that way, the robot movements can be limited more safely. No margin may be provided for the extent of the virtual safety barrier, namely the trajectory of movement of the robot in operation including the work or tool mounted on the robot wrist. However, for enhanced safety, setting a margin with a certain width is preferable. The margin may be adapted to be modifiable by rewriting the program. By setting a large margin width, the degree of freedom of movement of the robot arm can be obtained, but a larger physical space would be required. By setting a narrower margin width, the volume of wasteful space can be reduced, but the degree of freedom of movement of the robot arm would be reduced and, while the level of safety would increase, the frequency of the stop control being effected on the arm would increase. Thus, the margin with an appropriate width should be set depending on the actual operation environment of the robot.

In the present invention, the three-dimensional spatial regions may be defined in any desired manner, such as in terms of a set of points, a set of lines or a set of an envelope sphere. A plurality of three-dimensional spatial regions in a single robot may be defined by the same method or different methods in combination. It is preferable, however, to define all of the three-dimensional spatial regions in terms of envelope spheres, as envelope spheres can be defined by the central point and radius so that the amount of data can be reduced.

As an apparatus for conducting the above-described method, the invention further provides a robot movement limiting apparatus comprising:

means for defining in a memory a virtual safety barrier including a movement trajectory of a work or tool mounted on the wrist of a robot in operation;

means for defining at least two three-dimensional spatial regions including a part of the robot including the work or tool;

means for calculating a predicted position of each of said three-dimensional spatial regions that have been defined, on a movement trajectory;

means for matching the predicted position of each three-dimensional spatial region with the virtual safety barrier;

means for determining whether or not at least a part of the predicted position of any one of the defined three-dimensional spatial regions, based on trajectory calculations, is included in the virtual safety barrier; and control means for stopping the movement of the arm including the three-dimensional spatial region if it is determined that at least a part of the predicted position of the three-dimensional spatial region is included in said virtual safety barrier. All of these means may be incorporated into the control device of the robot main body.

The invention further provides a robot having the above-described robot movement limiting apparatus as part of its control device. One or, if necessary, more of such robots are disposed on the floor such that they can be independently operated and controlled. The robot movement limiting apparatus of the invention allows the virtual safety barrier to be defined as a narrow region, so that safety can be ensured even if a plurality of robots are disposed more closely to one another than they are in the prior art. Thus, the floor space can be effectively utilized.

As mentioned above, in the robot movement limiting apparatus of the invention, the degree of freedom of movement of the robot arm can be changed by the setting of the extent of the virtual safety barrier region (i.e., by how much margin is provided). The invention also provides a robot apparatus in which this fact is taken advantage of, the robot apparatus having a control device and two or more of the above-described robots that are controlled by said control device, wherein the means for defining in the memory said virtual safety barrier for each robot is capable of setting various margins for said virtual safety barrier.

In this robot apparatus, before operation, the margin width of the virtual safety barrier for those of the plurality of robots that are actually operated is defined such that the width does not pose any problem for the actual operation, while defining the margin width of the virtual safety barrier for other robots that are not to be operated as an extremely narrow width. In this way, the stop control can be immediately activated due to the narrow virtual safety barrier in case a robot with the virtual safety barrier with the narrow margin width perform unexpected movements due to disturbance or for some other reason, so that the robot can be reliably prevented from running out of control and colliding with the operator or peripheral equipment. It goes without saying that the other robots that are supposed to perform actual operations can reliably perform predetermined movements. Thus, in this robot apparatus, a safe operation of the robot can be ensured in terms of software, so that a reliable operation can be ensured even when a plurality of robots are installed under one control device.

The invention further provides a method of limiting the movement of a robot, comprising the steps of:

acquiring, as a reference value, a movement trajectory in each step at one or more locations including a work or tool mounted on a wrist of a robot by operating the robot once;

setting a boundary value for each step by adding a margin to the reference value;

determining whether any one of measured values in individual steps during the subsequent operations of the robot is within corresponding one of the boundary values; and effecting a control to stop the movement of the robot arm if any one of the measured values exceeds the corresponding boundary values.

In this invention, the boundary values correspond to the aforementioned "virtual safety barrier." In this method, too, the degree of freedom of movement of the robot arm can be adjusted by the extent of the margin width that is set. Thus, this method is effective in cases where the robot must be operated in environments in which even a slight error in position or posture cannot be tolerated. By acquiring as reference values the movement trajectories at a plurality of locations in each step, a more safety-oriented limitation of the movement of the robot can be realized.

DESCRIPTION OF THE PREFERRED EMBODIMENTS

Figure 1:
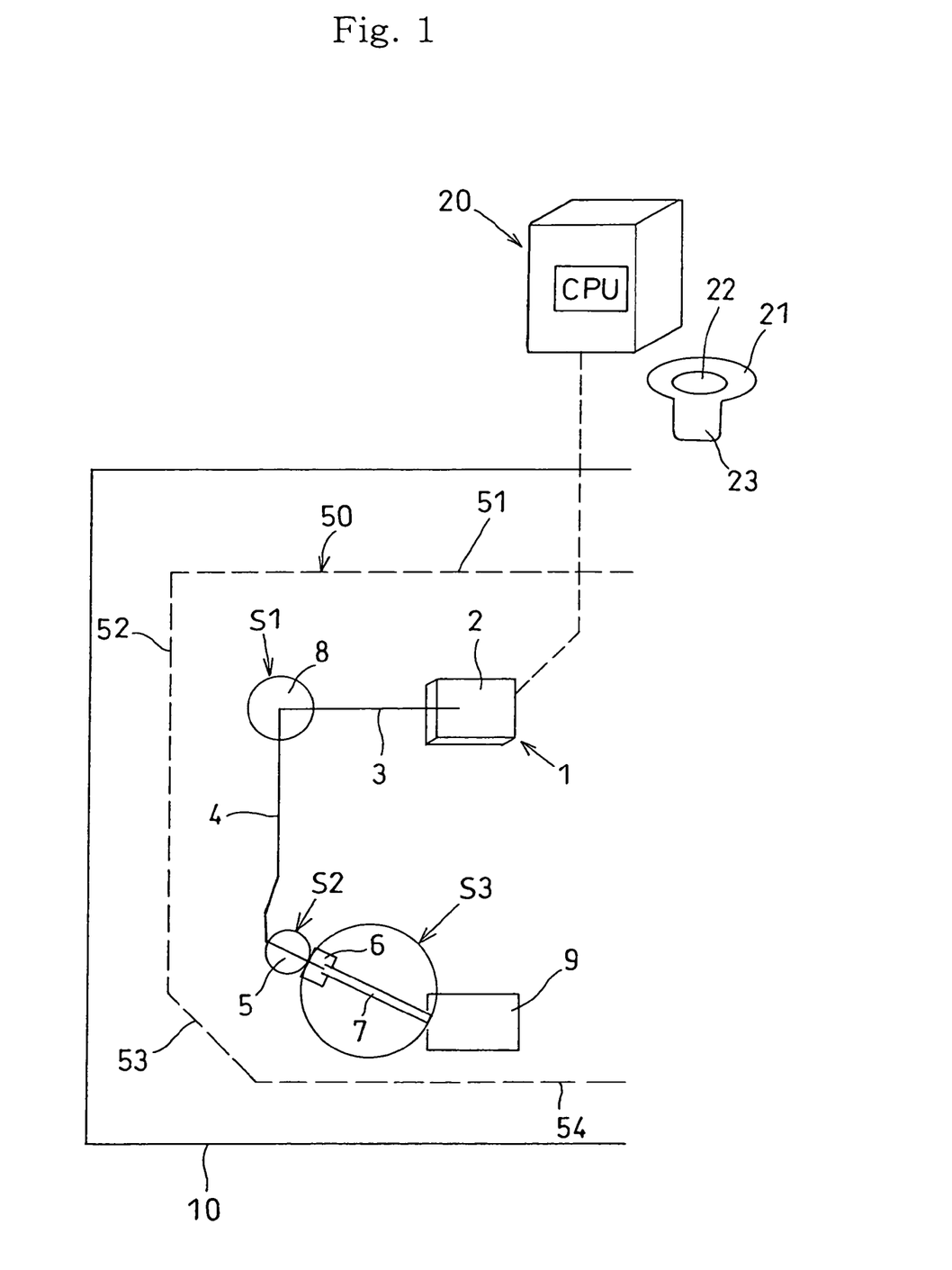
FIG. 1 illustrates the robot movement limiting method and apparatus according to the invention, and the operation of a robot equipped with the apparatus.

Referring to FIG. 1, the robot movement-limiting method and apparatus according to the invention, as well as the operation of a robot equipped with the apparatus will be described. A physical safety barrier 10 is put up on the floor of a factory, and a robot 1 is placed within the safety barrier 10. The robot 1 includes a main body 2 and two arms 3 and 4. At the tip of the arm 4 is mounted a wrist 5. A tool 7 or a welding gun is attached via a holding device 6 to the wrist 5. The arms 3 and 4 are connected by a joint 8. Numeral 9 designates a work or an object to be welded placed on the floor. A control device (CPU) 20 sends a necessary signal to the robot main body 2, and the arms 3 and 4 or the wrist 5 are moved along certain trajectories in a repetitive manner. The control device (CPU) 20, which includes a teaching tool 21, teaches the robot or rewrites the program. The teaching tool 21 includes a display 22 and an input portion 23. The display 22 displays the operation states of the robot 1, for example.

Figure 2:
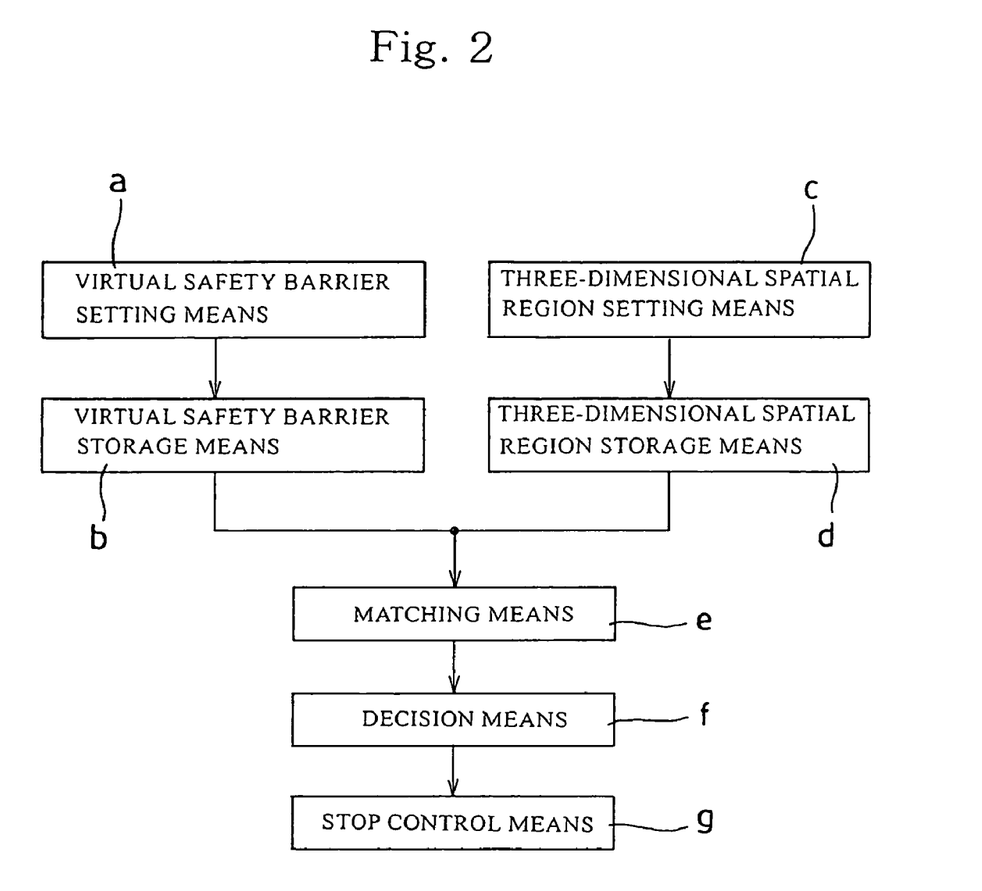
FIG. 2 shows a block diagram of the robot movement limiting apparatus of the invention.

Before the operation of the robot 1, a virtual safety barrier 50 is defined by a virtual safety barrier setting means a, as shown in FIG. 2. The virtual safety barrier 50 is then stored in a memory in the control device 20 by a virtual safety barrier setting storage means b. In practice, there is the prerequisite of installing a required number of robots 1 within a limited floor space in the factory. Based on that prerequisite, the physical safety barrier 10 is constructed, and then the virtual safety barrier 50 is set inside the safety barrier 1 for each robot and stored in the memory in a normal procedure. In that case, the trajectories of movement of the robot arm are taught such that the movement trajectories of the work and tools mounted on the wrist of the robot in operation are included within the virtual safety barrier 50. Alternatively, the movement trajectories of the robot arm may be first set, and then the virtual safety barrier 50 may be set such that it accommodates these trajectories. While in the illustrated example the virtual safety barrier 50 is defined by four lines 51 to 54, it may be defined by curves or a combination of curves and lines.

The three-dimensional spatial region setting means c defines three three-dimensional spatial regions S1, S2 and S3 including the joint 8, wrist 5, which are parts of the robot 1, and the tool 7 or the welding gun, respectively, all as spheres, for example. The three-dimensional spatial region storage means d then stores them in the memory in the control device 20. Specifically, the three-dimensional spatial region S1 including the joint 8 is defined as a sphere the center of which corresponds to the center of bending of the joint 8 with a predetermined radius. The three-dimensional spatial region S2 including the wrist 5 is defined as a sphere the center of which lies on the central axis of the wrist 5, with a radius about one half the length of the wrist 5. The three-dimensional spatial region S3 including the tool 7 is defined as a sphere with a center lying on the central axis of the welding gun and a radius about one half the combined lengths of the holding device 6 and the welding gun 7. Each one of the three-dimensional spatial regions may be the sphere with roughly the aforementioned center and radius. If any of the three-dimensional spatial regions is to be defined as a sphere with a larger radius, while the level of safety can be increased, it would be necessary to extend the area covered by the virtual safety barrier 50 (or to modify the program such that the range of movement of each part is narrowed), which would result in a reduced spatial efficiency (or the movement of the arm would be limited).

Figure 3:
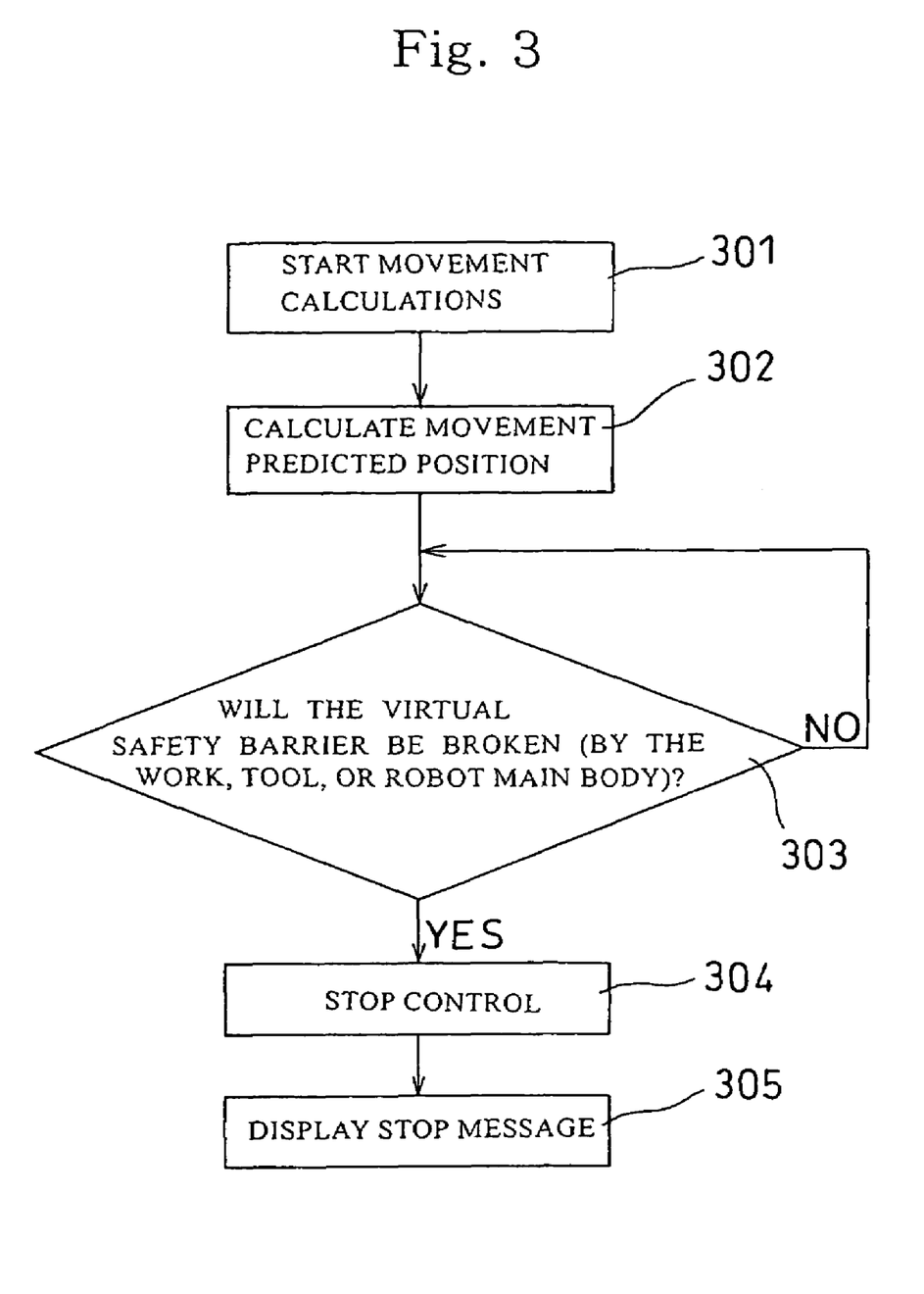
FIG. 3 shows a flowchart of the robot movement limiting method.

The robot is operated according to the preset program. As shown in the flowchart of FIG. 3, the control device starts movement calculations (trajectory calculations) for the three-dimensional spatial regions S1 to S3 (step 301). Based on the calculations, predicted transported positions (estimated positions) are calculated (step 302). A matching means e matches the predicted positions obtained by the trajectory calculations with the virtual safety barrier stored in the memory at predetermined periods. A decision means f then determines whether or not at least a part of any one of the defined three-dimensional spatial regions S1 to S3 exceeds the virtual safety barrier 50 (step 303). The virtual safety barrier 50 is defined as described above, and none of the three-dimensional spatial regions S1 to S3 exceeds the virtual safety barrier 50 as long as the robot operates according to the preset program, and predetermined movements are repeated.

When the work content of the robot is to be changed, for example, new data is fed to the robot 1 (control device 30) via the teaching tool 21. As a result, a new target position is set, and the processes in steps 301 to 303 are performed again. The definition of the virtual safety barrier 50 that has previously been set is left as is for safety reasons. Because a predicted transported position (estimated position) for a new target position is calculated in this state, it is possible that the predicted position might exceed the virtual safety barrier 50. If the decision means f determines that the virtual safety barrier 50 would be exceeded, a stop control means g of the control device initiates a stop control (step 304). If necessary, a stop message is displayed on a display 22 of the teaching tool 21 (step 305).

In this example, the three-dimensional spatial regions S1 to S3 are set for three locations of the robot 1, and the stop control is initiated upon determination that the predicted position of any of the three regions would exceed the virtual safety barrier 50, so that a high level of safety can be ensured. In this example, the three-dimensional spatial region S1 is set for the joint 8 of the arm, so that the problem of the so-called "elbow-hitting phenomena" can be avoided. Further, because the contact with the virtual safety barrier is detected based on a plurality of three-dimensional spatial regions, each three-dimensional spatial region can be relatively narrow. As a result, the margin between the movement trajectories of the robot and the virtual safety barrier can be narrowed. In the case where the virtual safety barrier is set in advance, more robots can be installed within the same floor area.

Figure 4:
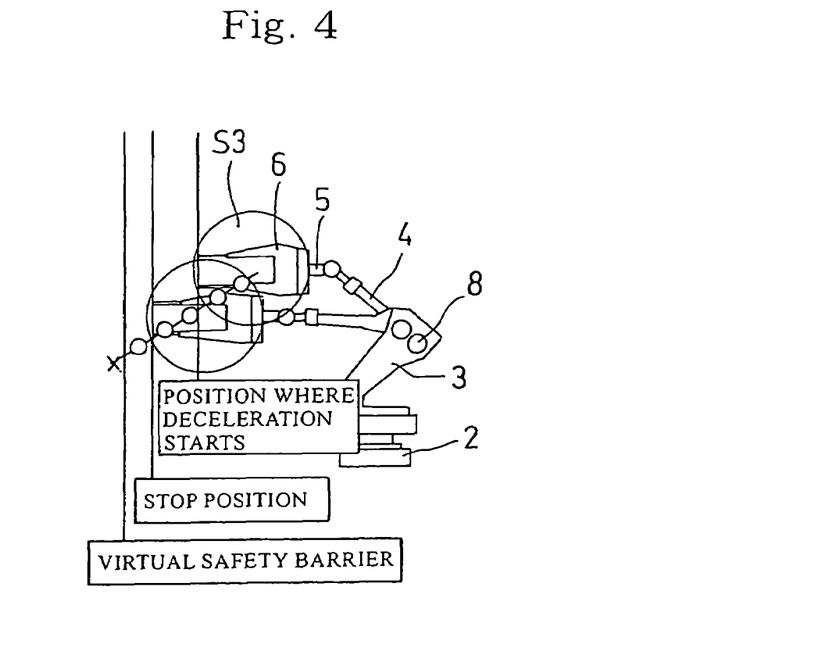
FIG. 4 illustrates a stop control in the invention as it is performed in an actual robot.

Referring to FIG. 4, the aforementioned stop control will be described with reference to an actual robot. The three-dimensional spatial region S3 is defined for the tool 7 or the welding gun, and the virtual safety barrier 50 is stored in the memory. Calculations are conducted for a movement toward point X (step 301), and the predicted transported position is calculated (step 302). Then, the fact that the predicted trajectory of the three-dimensional spatial region S3 would come into contact with the virtual safety barrier 50 is recognized instantaneously (step 303), and the stop control is initiated immediately, i.e., sufficiently prior to the position of the virtual safety barrier. Thus, the arm can be stopped before the virtual safety barrier even when inertial force is taken into consideration.

Figure 5:
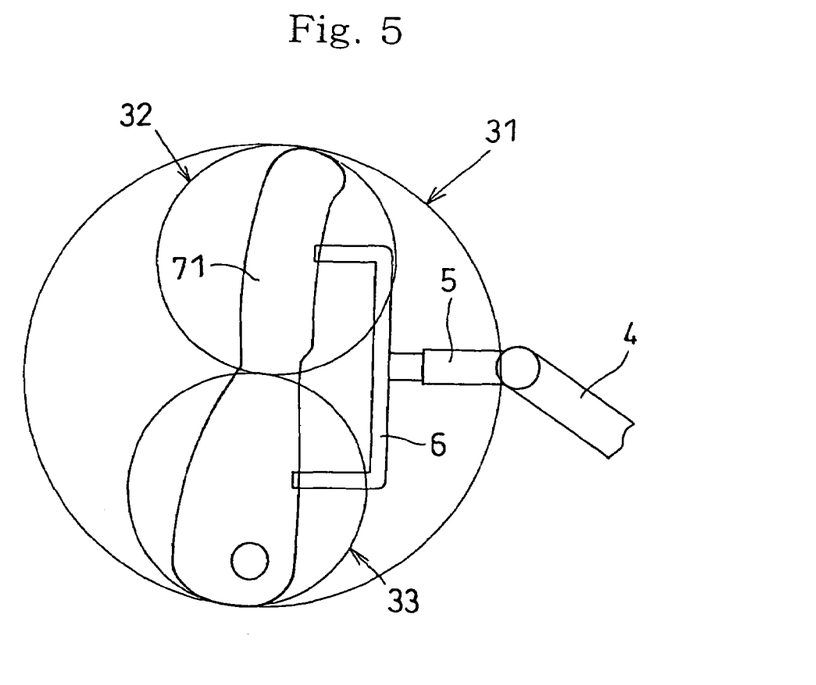
FIG. 5 shows another example of the manner in which three-dimensional spatial regions are defined.

FIG. 5 shows another example of the definition of the three-dimensional spatial regions. In this example, the wrist 5 is provided with a large holding device 6, which is holding a large work 71 such as an automobile body. The three-dimensional spatial region including the work 71, or a sphere S31, has a large radius and does not contribute much to the improvement of the surrounding space efficiency. Therefore, the work 71 is divided into a plurality (two in the illustrated example) of parts such that the entire work is included in a plurality (two) of smaller spheres S32 and S33 with smaller radii, thereby maintaining a high level of space efficiency.

Figure 6:
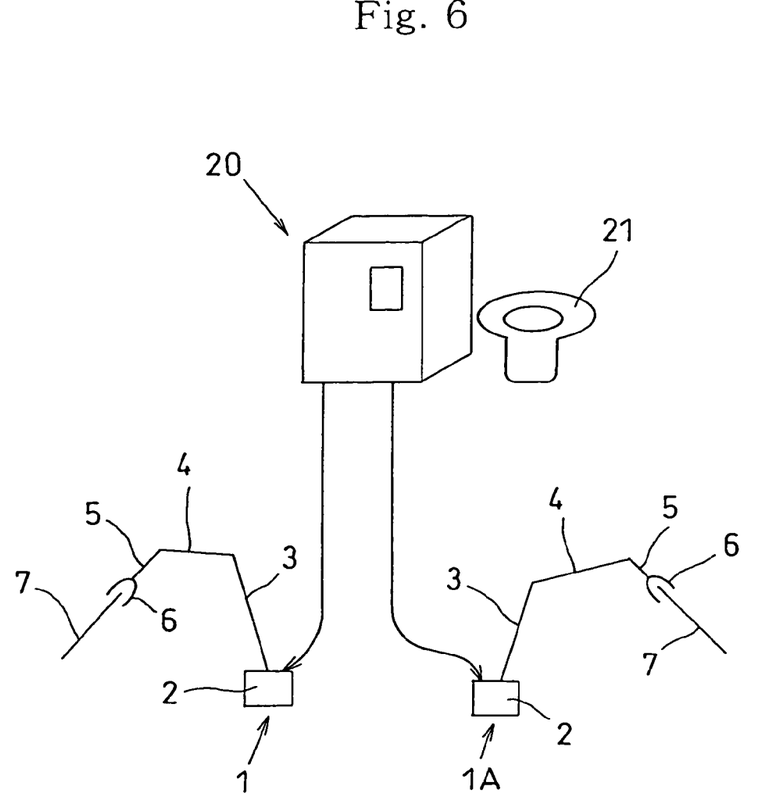
FIG. 6 shows another example of the robot apparatus of the invention.

FIG. 6 shows another example of the robot apparatus of the invention. In this example, the aforementioned two robots 1 and 1A are connected to the single control device 20. The two robots are adapted to be individually operated by switching on a software basis. The means for defining the virtual safety barrier in the memory can define different margins for the robots 1 and 1A. Specifically, the means defines the margin of the virtual safety barrier for one of the two robots 1 and 1A that is actually operated, namely robot 1, to have such a width as to pose no problem in actual operation. On the other hand, the means defines the margin of the virtual safety barrier for the other robot 1A that is not being operated to have an extremely narrow width.

In this way, should the robot 1A that is not operated carries out an unexpected movement due to disturbance or the like, the stop control is immediately activated for the robot 1A because of the narrow virtual safety barrier. Thus, the robot can be reliably prevented from operating out of control to hit the operator or peripheral equipment, while the robot 1 for actually performing work can reliably and normally carry out necessary movements.

Figure 7:
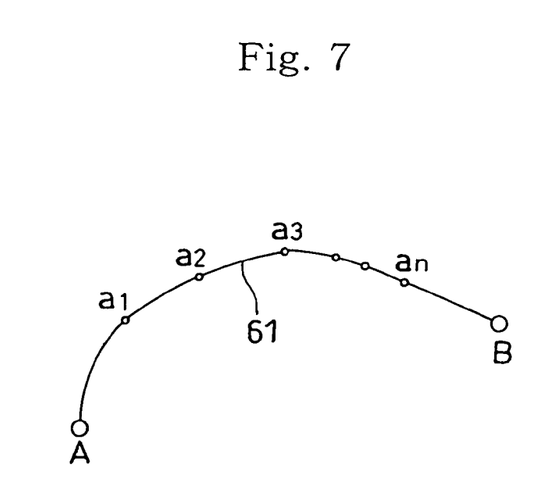
FIG. 7 shows another embodiment of the present invention.
Figure 8:
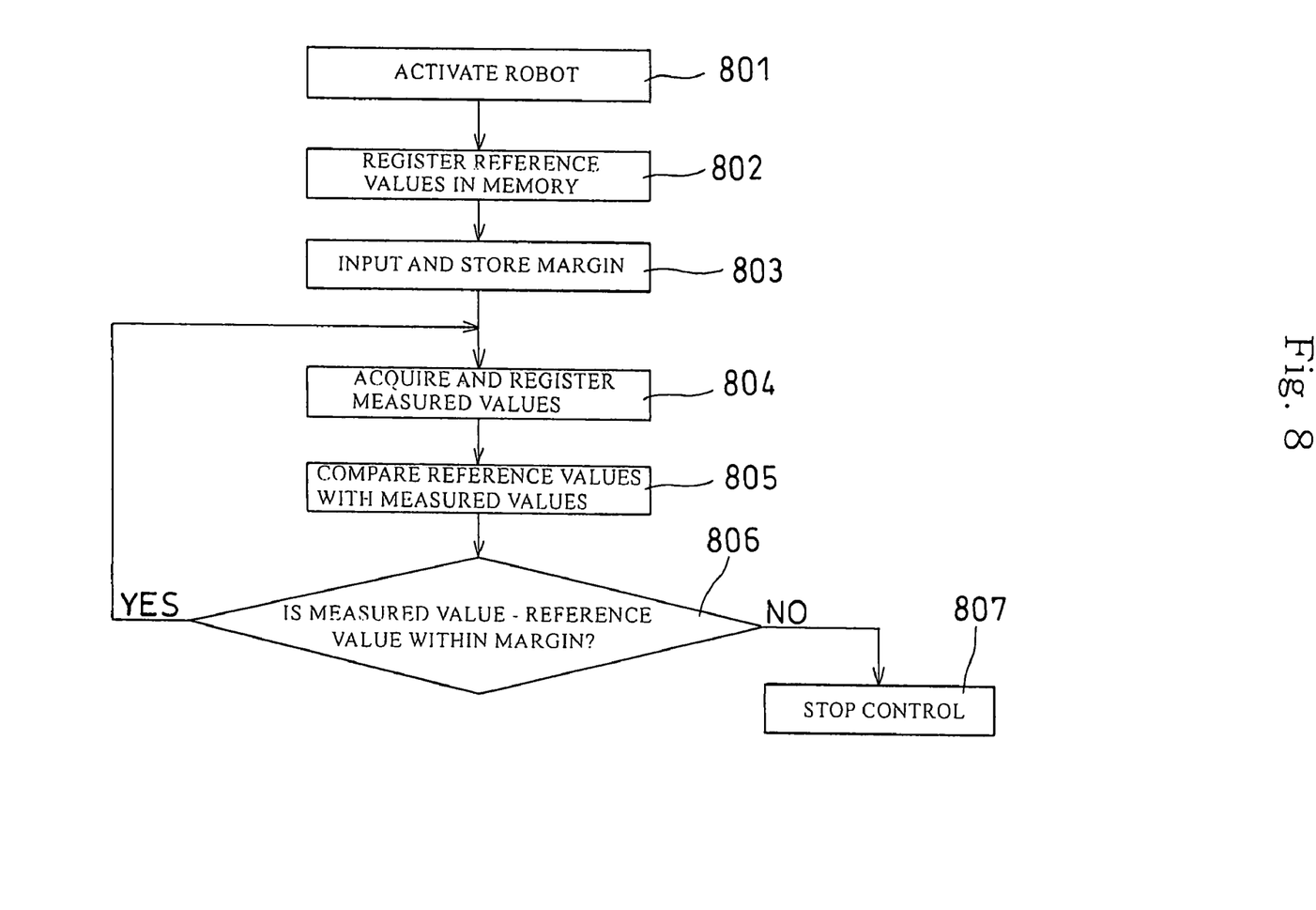
FIG. 8 shows a flowchart of the embodiment shown in FIG. 7.

Referring to FIG. 7, another embodiment of the invention will be described. FIG. 8 shows a flowchart for the embodiment. In FIG. 7, numeral 61 indicates the trajectory of a single movement of the robot from point A to point B, and a1, a2, . . . an indicate arbitrary points on the trajectory 61. The robot is activated (step 801), and reference values a$1p$, a$2p$, . . . , anp concerning the transported position information or posture information at the points a1, a2, . . . , an are obtained as appropriate coordinate values that are then stored in a memory (step 802) (see also FIG. 9). Then, margin K with a required width is input and stored for each reference value (step 803). For example, when the coordinate values x, y and z for reference value a$1p$ are px, py and pz, px±k, py±k and pz±k constitute the range with a margin (namely the aforementioned "virtual safety barrier").

Figure 9:
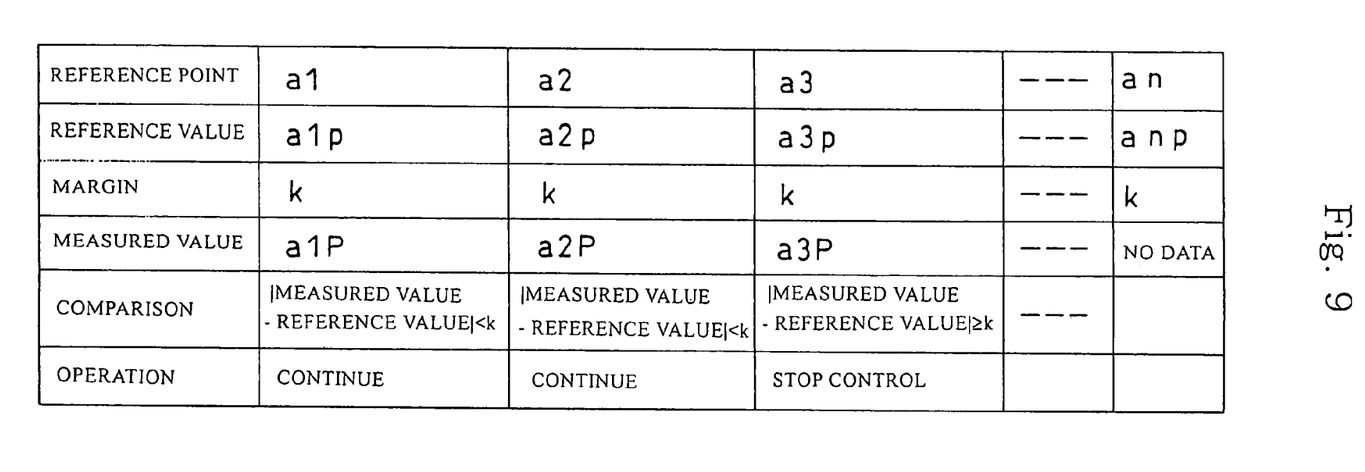
FIG. 9 shows a data table or the like for the embodiment shown in FIG. 7.

In the subsequent robot operations, measured values a1P, a2P, . . . , anP are obtained at the points a1, a2, . . . , an (step 804), and these values are compared with the reference values a$1p$, a$2p$, . . . , anp at corresponding points (steps 805 and 806). For example, when the coordinate values for the measured value a1P at point a1 are Px, Py and Pz, comparisons are made between Px and px±k, Py and py±k and Pz and pz±k. If the range with margin k ("virtual safety barrier") is not exceeded, as shown in FIG. 9, the movement of the art is continued, and similar comparisons are made between measured values and reference values at the next point a2. This process is repeated. If the measured value exceeds the range with margin k ("virtual safety barrier") at any of the points, the control device conducts a stop control (step 807).

In the example shown in FIG. 9, the absolute value of the difference between the measured values and the reference values at point a3 is equal to or greater than the margin k, so that the stop control is effected by the control device at this point.

In this method, too, the degree of freedom of movement of the robot arm can be adjusted by adjusting the margin k. Thus, this method is effective in cases where the robot is operated in environments where only a slight error in position or posture cannot be tolerated. Further, in this method, as the movement trajectory upon a single movement of the robot from point A to point B, two or more points can be extracted from the movement spaces or the three-dimensional spatial regions including the work or tools mounted on the wrist of the robot. The aforementioned "movement trajectory" can then be set for each of the two or more points, and reference values can be obtained for each movement trajectory, so that, in subsequent operations, measured values for each movement trajectory can be obtained and compared with the reference values. In this way, a more safety-oriented limitation of the robot movements can be realized.

In the present invention, the data retained by the control device can be roughly divided into data concerning the virtual safety barrier, program data concerning the movement of the robot arm, and data concerning system parameters. During operations using this type of robot, it is desirable that the individual pieces of data be backed up, and the data concerning the program data and the system parameters might need to be rewritten on the factory floor. However, the data concerning the virtual safety barrier should not be allowed to be readily rewritten on the work floor, from the viewpoint of safety management. Thus, it is effective to employ a data management method whereby the data concerning the virtual safety barrier is stored in a different region from those for the program data concerning the movement of the robot arm and the data concerning the system parameters, and whereby the data concerning the virtual safety barrier cannot be rewritten unless a password is entered.

Further, it is particularly recommendable, from the viewpoint of increased robot operation safety, to visualize and display the arrangements of equipment around the robot, the virtual safety barrier 50, the robot itself, and works and tools on the display 22 of the teaching tool 21, such that their trajectories are displayed in a continuous manner as the robot is operated.

In a first embodiment of the invention, two or more three-dimensional spatial regions including the joint, wrist or the work or tools held by the wrist of the robot are defined. Based on the determination of whether any one of the three-dimensional spatial regions comes into contact with the virtual safety barrier for limiting the movement of the robot, the robot arm is stopped. Thus, the virtual safety barrier region can be set to be narrower than the conventional region, allowing the floor area or space in a factory or the like to be effectively utilized without waste. Further, a predicted position obtained by trajectory calculations is matched with the virtual safety barrier, and the movement of the arm is immediately stopped upon determination that a contact with the virtual safety barrier is imminent. Thus, the arm can be safely stopped before the virtual safety barrier even when the robot is large-sized or of a high-speed type. Thus, a safer operation of the robot can be carried out.

In a second embodiment of the invention, the robot is actually operated and reference values are obtained from a plurality of points on the trajectory of movement of the robot. A margin of an arbitrary width is added to the reference values to obtain the virtual safety barrier. In subsequent operations, a movement stop control is effected depending on whether or not the measured value at each point exceeds the virtual safety barrier. In this embodiment, similar effects to those mentioned above can be obtained. Particularly, by narrowing the margin, a detection capability can be expected such that a slight error in position or posture can be detected.

What is claimed is:

1. A method of limiting the movement of a robot, said method comprising the steps of:
    constructing a physical safety barrier surrounding a movable robot including a base mounted on a floor;
    defining in a memory a virtual safety barrier including a trajectory of a work or a tool mounted on a wrist of an arm of the robot in operation, the virtual safety barrier having boundaries spaced inward from the physical safety barrier and surrounding the work or tool;
    defining in the memory a margin width of the virtual safety barrier, wherein a degree of freedom of a movement of the work or tool can be obtained;
    defining in the memory at least two three-dimensional spatial regions including parts of the arm of the robot including said work or tool, wherein each of the three-dimensional spatial regions has a substantially spherical shape with a predetermined radius, wherein the radius for each of the three-dimensional spatial regions is configured to maintain a space efficiency;
    calculating a movement trajectory of the work or tool included in the defined three-dimensional spatial regions;
    determining a predicted position of each of the defined three-dimensional spatial regions based on the trajectory calculation;
    matching the predicted position of each of the defined three-dimensional spatial regions with said virtual safety barrier;
    recognizing a forward position of at least one of the three-dimensional spatial regions spaced apart from the virtual safety barrier by a predetermined distance as a deceleration start position to safely stop the work or tool; and
    carrying out a control to start the deceleration of the work or tool when at least one of the three-dimensional spatial regions is at the predetermined distance ahead of the virtual safety barrier and stop the movement of the work or tool ahead of the virtual safety barrier.

2. The method of limiting the movement of a robot according to claim 1, wherein said three-dimensional spatial regions are defined by at least one of the group consisting of a set of points, a set of lines, and an envelope sphere.

3. A robot movement limiting apparatus comprising:
    means for constructing a physical safety barrier surrounding a movable robot including a base mounted on a floor and defining in a memory a virtual safety barrier including a movement trajectory of a work or a tool mounted on a wrist of an arm of the robot in operation, the virtual safety barrier having boundaries spaced inward from the physical safety barrier and surrounding the work or tool, wherein the virtual safety barrier has a margin width such that a degree of freedom of the movement of the work or tool can be obtained;
    means for defining in the memory at least two three-dimensional spatial regions including a part of the robot including said work or tool, wherein each of the three-dimensional spatial regions has a substantially spherical shape with a predetermined radius, wherein the radius for each of the three-dimensional spatial regions is configured to maintain a space efficiency;
    means for calculating a movement trajectory of the work or tool included in the defined three-dimensional spatial regions, and calculating a predicted position of each of said three-dimensional spatial regions based on the trajectory calculation;
    means for matching the predicted position of each three-dimensional spatial region with said virtual safety barrier;
    means for recognizing a forward position of at least one of the three-dimensional spatial regions spaced apart from the virtual safety barrier by a predetermined distance as a deceleration start position to safely stop the work or tool; and
    control means for starting the deceleration of the work or tool when at least one of the three-dimensional spatial regions is at the predetermined distance ahead of the virtual safety barrier and stopping the movement of the work or tool.

4. The robot movement limiting apparatus according to claim 3, wherein said three-dimensional spatial regions are defined by at least one of the group consisting of a set of points, a set of lines, and an envelope sphere.

5. A robot having the robot movement limiting apparatus according to claim 3 or 4 as part of a control device.

6. A robot having a control device and two or more robots according to claim 5 that are controlled by said control device, wherein said means for defining in the memory said virtual safety barrier for each robot is capable of setting various margins for said virtual safety barrier.

7. A method of limiting the movement of a robot, said method comprising the steps of:

constructing a physical safety barrier surrounding a movable robot including a base mounted on a floor;

defining in a memory a virtual safety barrier including a trajectory of a work or a tool mounted on a wrist of an arm of the robot in operation, the virtual safety barrier having boundaries spaced inward from the physical safety barrier and surrounding the work or tool, wherein the virtual safety barrier is defined to be immovable with the robot under a working environment;

defining in the memory a margin width of the virtual safety barrier, wherein a degree of freedom of a movement of the work or tool can be obtained;

defining in the memory at least two three-dimensional spatial regions including parts of the arm of the robot including said work or tool, wherein each of the three-dimensional spatial regions has a substantially spherical shape with a predetermined radius, wherein the radius for each of the three-dimensional spatial regions is configured to maintain a space efficiency;

calculating the movement trajectory of the work or tool included in the defined three-dimensional spatial regions;

determining a predicted position of each of the defined three-dimensional spatial regions based on the trajectory calculation;

matching the predicted position of each of the defined three-dimensional spatial regions with said virtual safety barrier;

recognizing a forward position of at least one of the three-dimensional spatial regions spaced apart from the virtual safety barrier by a predetermined distance as a deceleration start position to safely stop the work or tool; and carrying out a control to start the deceleration of the work or tool when at least one of the three-dimensional spatial regions is at the predetermined distance ahead of the virtual safety barrier and stop the movement of the work or tool ahead of the virtual safety barrier.

8. The method of limiting the movement of a robot according to claim 7, wherein said three-dimensional spatial regions are defined by at least one of the group consisting of a set of points, a set of lines, and an envelope sphere.

* * * * *